US012742285B2

(12) United States Patent
Oura et al.

(10) Patent No.: US 12,742,285 B2
(45) Date of Patent: Sep. 22, 2026

(54) ARTIFICIAL LEATHER AND METHOD FOR MANUFACTURING THE SAME

(71) Applicant: Toray Industries, Inc., Tokyo (JP)

(72) Inventors: Haruka Oura, Osaka (JP); Tatsuya Hagiwara, Anpachi-gun (JP); Misao Omori, Otsu (JP); Yukihiro Matsuzaki, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 200 days.

(21) Appl. No.: 18/279,101

(22) PCT Filed: Mar. 10, 2022

(86) PCT No.: PCT/JP2022/010655

§ 371 (c)(1),
(2) Date: Aug. 28, 2023

(87) PCT Pub. No.: WO2022/196529

PCT Pub. Date: Sep. 22, 2022

(65) Prior Publication Data

US 2024/0141584 A1 May 2, 2024

(30) Foreign Application Priority Data

Mar. 18, 2021 (JP) ................................ 2021-044292
Sep. 29, 2021 (JP) ................................ 2021-158860

(51) Int. Cl.

| | |
|---|---|
| ***D06M 15/564*** | (2006.01) |
| ***B32B 5/02*** | (2006.01) |
| ***B32B 5/06*** | (2006.01) |
| ***B32B 5/26*** | (2006.01) |
| ***D01F 1/10*** | (2006.01) |
| ***D01F 8/14*** | (2006.01) |
| ***D04H 1/413*** | (2012.01) |
| ***D04H 1/435*** | (2012.01) |
| ***D04H 1/4382*** | (2012.01) |
| ***D04H 1/4391*** | (2012.01) |
| ***D04H 1/46*** | (2012.01) |
| ***D06M 15/333*** | (2006.01) |
| *D06M 101/20* | (2006.01) |
| *D06M 101/32* | (2006.01) |

(52) U.S. Cl.

CPC .......... *D06M 15/564* (2013.01); *B32B 5/022* (2013.01); *B32B 5/024* (2013.01); *B32B 5/06* (2013.01); *B32B 5/275* (2021.05); *D01F 1/10* (2013.01); *D01F 8/14* (2013.01); *D04H 1/413* (2013.01); *D04H 1/435* (2013.01); *D04H 1/4383* (2020.05); *D04H 1/43838* (2020.05); *D04H 1/43918* (2020.05); *D04H 1/46* (2013.01); *D06M 15/333* (2013.01); *B32B 2250/20* (2013.01); *B32B 2260/023* (2013.01); *B32B 2260/046* (2013.01); *B32B 2262/0253* (2013.01); *B32B 2262/0284* (2013.01); *B32B 2262/124* (2021.05); *B32B 2262/16* (2021.05); *B32B 2264/10* (2013.01); *B32B 2264/108* (2013.01); *B32B 2264/12* (2013.01); *B32B 2264/301* (2020.08); *B32B 2264/302* (2020.08); *B32B 2307/54* (2013.01); *B32B 2307/554* (2013.01); *D06M 2101/20* (2013.01); *D06M 2101/32* (2013.01)

(58) Field of Classification Search

USPC .......................................................... 442/60
See application file for complete search history.

(56) References Cited

U.S. PATENT DOCUMENTS

| | | | | |
|---|---|---|---|---|
| 2019/0040572 A1* | 2/2019 | Lee et al. | ............ | D06N 3/0004 |
| 2019/0316284 A1 | 10/2019 | Hansen et al. | | |
| 2020/0277730 A1 | 9/2020 | Nakayama et al. | | |

FOREIGN PATENT DOCUMENTS

| | | |
|---|---|---|
| CN | 103122127 A | 5/2013 |
| JP | 6032824 A | 2/1985 |
| JP | 6178828 A | 4/1986 |

(Continued)

OTHER PUBLICATIONS

Japanese Notice of Reasons for Refusal for Japanese Application No. 2022-516338, dated Jul. 29, 2022, with translation, 8 pages.
International Search Report and Written Opinion for International Application No. PCT/JP2022/010655, with translation, dated May 24, 2022, 5 pages.
Office Action (The First Office Action) issued Apr. 19, 2025, by the State Intellectual Property Office of People's Republic of China in corresponding Chinese Patent Application No. 202280019208.0 and an English translation of the Office Action. (11 pages).
Extended European Search Report issued Apr. 17, 2025, by the European Patent Office in corresponding European Patent Application No. 22771280.9-1102. (6 pages).

(Continued)

*Primary Examiner* — Ula C Ruddock
(74) *Attorney, Agent, or Firm* — BUCHANAN INGERSOLL & ROONEY PC

(57) ABSTRACT

In order to provide artificial leather having both strength (in particular, tensile strength and tear strength), surface appearance, and a dense feeling in artificial leather including a fiber-entangled body containing a nonwoven fabric made of ultrafine fibers containing a large amount of inorganic particles (in particular, metal compounds) as a constituent element, and an elastic polymer, the artificial leather of the present invention is artificial leather including a fiber-entangled body containing a nonwoven fabric made of ultrafine fibers having an average single fiber diameter of 1.0 μm or more and 10.0 μm or less as a constituent element and an elastic polymer, and satisfies the following requirements: (1) the ultrafine fibers include a polyester-based resin containing a manganese-based compound; (2) an average particle diameter of the manganese-based compound is 0.01 μm or more and 0.20 μm or less; and (3) the ultrafine fibers contain a manganese element in an amount of 0.1 ppm or more and 50.0 ppm or less in 100 mass % of the ultrafine fiber.

5 Claims, No Drawings

(56) References Cited

FOREIGN PATENT DOCUMENTS

| | | | | |
|---|---|---|---|---|
| JP | 2001348728 | A | | 12/2001 |
| JP | 2003020329 | A | | 1/2003 |
| JP | 2007-063714 | A | | 3/2007 |
| JP | 2007308868 | A | | 11/2007 |
| JP | 2008081916 | A | * | 4/2008 |
| JP | 2008231638 | A | | 10/2008 |
| JP | 2012012758 | A | | 1/2012 |
| JP | 2015010294 | A | | 1/2015 |
| JP | 2015081277 | A | | 4/2015 |
| JP | 2018024965 | A | | 2/2018 |
| JP | 2018-039918 | A | | 3/2018 |
| JP | 2019027001 | A | | 2/2019 |
| JP | 2020-084333 | A | | 6/2020 |
| KR | 20040012126 | A | * | 2/2004 ............... D01F 8/14 |
| KR | 100470298 | B1 | * | 2/2005 ............... D01D 5/34 |

OTHER PUBLICATIONS

Office Action (The Second Office Action) issued Oct. 22, 2025, by the State Intellectual Property Office of People's Republic of China in corresponding Chinese Patent Application No. 202280019208.0 and an English translation of the Office Action.(8 pages).

Office Action (Request for the Submission of an Opinion) issued Mar. 31, 2026, by the Korean Intellectual Property Office in corresponding Korean Patent Application No. 10-2023-7027755 and an English translation of the Office Action. (13 pages).

* cited by examiner

ARTIFICIAL LEATHER AND METHOD FOR MANUFACTURING THE SAME

CROSS REFERENCE TO RELATED APPLICATIONS

This is the U.S. National Phase application of PCT/JP2022/010655, filed Mar. 10, 2022, which claims priority to Japanese Patent Application No. 2021-044292, filed Mar. 18, 2021 and Japanese Patent Application No. 2021-158860 filed Sep. 29, 2021, the disclosures of each of these applications being incorporated herein by reference in their entireties for all purposes.

FIELD OF THE INVENTION

The present invention relates to artificial leather excellent in tensile strength, tear strength, surface appearance, and dense feeling.

BACKGROUND OF THE INVENTION

Suede-like artificial leather mainly including a fiber-entangled body containing a nonwoven fabric composed of ultrafine fibers as a constituent element as well as an elastic polymer has excellent characteristics as compared with natural leather in terms of high durability, uniformity of quality, and the like, and is used in a wide range of fields such as automobile interior materials, furniture, miscellaneous goods, and clothing. Among them, as the automobile interior material, characteristics such as durability (strength) and abrasion resistance that can withstand repeated getting on and off are required in an application of a sheet material, and characteristics such as light resistance that can withstand light irradiation are particularly required in applications of an instrument panel and a dashboard material.

In the applications described above, a pigment may be generally added to the nonwoven fabric used as the fiber-entangled body in order to achieve uniform color developability with a dark color. In addition, in a case where a catalyst is added to improve a reaction rate during polymerization of raw materials, titanium oxide may be added to increase brightness of the artificial leather. However, when a raw material containing a large amount of inorganic particles (metal compounds) is used, strength and rigidity of the fibers may be reduced in some cases. As a result, since the fibers are easily flattened in a thickness direction of the nonwoven fabric at an initial stage of the process of entangling the fibers, entanglement properties are deteriorated, and the strength, surface appearance, and dense feeling as the artificial leather tend to be impaired. Therefore, in artificial leather using a raw material containing a large amount of inorganic particles, a method for achieving both the strength, surface appearance, and dense feeling has been required for some time.

As such a technique, for example, Patent Document 1 proposes a method for improving spinnability and increasing an overall yield in the entire process by using titanium atoms or aluminum atoms as an ultrafine fiber polymerization catalyst instead of an antimony catalyst that is likely to cause defects in raw cotton. Then, Patent Document 2 proposes a method for obtaining a polyester fiber excellent in moisture absorbency and hydrolysis resistance by making the polyester fiber contain an alkali metal phosphate. In addition, Patent Document 3 proposes a method for obtaining a polyester fiber excellent in light resistance by making the polyester fiber contain a manganese compound.

PATENT DOCUMENTS

Patent Document 1: JP 2008-231638 A
Patent Document 2: JP 2015-81277 A
Patent Document 3: JP 2003-20329 A

SUMMARY OF THE INVENTION

Since the artificial leather obtained by the method disclosed in Patent Document 1 uses titanium atoms or aluminum atoms instead of the antimony catalyst, the spinnability is improved and the overall yield is improved to some extent, but there is a problem such that the obtained polymer has a yellowish color tone and is poor in heat resistance.

The polyester fibers obtained by the methods disclosed in Patent Documents 2 and 3 can be applied functions such as moisture absorbency and light resistance to the fibers to some extent without using a special additive, and thus the spinnability can be improved to some extent. However, in a case where the fibers are further thinned, it is difficult to maintain yarn strength and stiffness, and there is a problem such that the fibers are easily flattened in the thickness direction of the nonwoven fabric in the process of entangling the fibers.

Therefore, the present invention has been made in view of the above circumstances, and an object of the present invention is to provide artificial leather having both strength (in particular, tensile strength and tear strength), surface appearance, and a dense feeling in artificial leathers including a fiber-entangled body containing a nonwoven fabric that is made of ultrafine fibers containing a large amount of inorganic particles (in particular, metal compounds) as a constituent element, and an elastic polymer.

As a result of repeated studies by the present inventors to achieve the above object, it has been found that when a manganese compound is added to ultrafine fibers constituting a fiber-entangled body of artificial leather, and an addition amount and an average particle diameter thereof are set within prescribed ranges, not only processing can be performed without impairing operability of spinning, but also artificial leather in which a decrease in the strength of the ultrafine fibers is suppressed, and the surface appearance and dense feeling are achieved can be obtained as well.

The present invention has been completed based on these findings, and the present invention provides the following invention.

In other words, the artificial leather according to embodiments of the present invention is artificial leather including a fiber-entangled body containing a nonwoven fabric that is made of ultrafine fibers having an average single fiber diameter of 1.0 μm or more and 10.0 μm or less as a constituent element as well as an elastic polymer, and satisfies the following requirements:

(1) the ultrafine fibers include a polyester-based resin containing a manganese-based compound;

(2) an average particle diameter of the manganese-based compound is 0.01 μm or more and 0.20 μm or less; and (3) the ultrafine fibers contain a manganese element in an amount of 0.1 ppm or more and 50.0 ppm or less in 100 mass % of the ultrafine fiber.

According to a preferred aspect of the artificial leather of the present invention, the ultrafine fibers further contain a phosphorus-based compound.

According to a preferred aspect of the artificial leather of the present invention, a manganese element molar equivalent A contained in the ultrafine fibers and a phosphorus element molar equivalent B contained in the ultrafine fibers satisfy a relationship of a molar ratio of the following formula (I):

$$20 \leq B/A \leq 200 \quad \text{(I).}$$

According to a preferred aspect of the artificial leather of the present invention, the ultrafine fibers further contain carbon black.

According to a preferred aspect of the artificial leather of the present invention, the fiber-entangled body includes only the nonwoven fabric.

According to a preferred aspect of the artificial leather of the present invention, the fiber-entangled body further includes a woven fabric, and the nonwoven fabric and the woven fabric are entangled and integrated.

In addition, the method for manufacturing the artificial leather of the present invention preferably includes: a sea-island type composite fiber forming step of performing sea-island type composite spinning using a polyester-based resin containing a manganese-based compound having an average particle diameter of 0.01 μm or more and 0.20 μm or less as an island component and a thermoplastic resin having different solvent solubility from that of the island component as a sea component; a fiber-entangled body forming step of forming a fiber-entangled body including the sea-island type composite fibers; an ultrafine fiber forming step of dissolving and removing the sea component from the sea-island type composite fibers to form ultrafine fibers having an average single fiber diameter of 1.0 μm or more and 10.0 μm or less; and an elastic polymer applying step of applying an elastic polymer to the fiber-entangled body.

According to embodiments of the present invention, it is possible to prevent the fibers from being flattened in the thickness direction of the nonwoven fabric in the process of entangling the fibers, and thus it is possible to obtain artificial leather in which a fiber-entangled body is further entangled. The obtained artificial leather is not only excellent in the durability (strength) and abrasion resistance that can withstand repeated rubbing, but also excellent in surface appearance and excellent in surface dense feeling.

DETAILED DESCRIPTION OF EMBODIMENTS OF THE INVENTION

The artificial leather according to embodiments of the present invention is artificial leather including a fiber-entangled body containing a nonwoven fabric that is made of ultrafine fibers having an average single fiber diameter of 1.0 μm or more and 10.0 μm or less as a constituent element, and an elastic polymer, and satisfies the following requirements:

(1) the ultrafine fibers include a polyester-based resin containing a manganese-based compound;

(2) an average particle diameter of the manganese-based compound is 0.01 μm or more and 0.20 μm or less; and (3) the ultrafine fibers contain a manganese element in an amount of 0.1 ppm or more and 50.0 ppm or less in 100 mass % of the ultrafine fiber.

Hereinafter, these constituent elements will be described in detail, but the present invention is not limited to the scope described below at all as long as the gist thereof is not exceeded.

[Fiber-Entangled Body]

The ultrafine fibers constituting the fiber-entangled body used in embodiments of the present invention are made of a polyester-based resin from a viewpoint of durability, particularly mechanical strength, heat resistance, and the like.

Examples of the polyester-based resin include polyethylene terephthalate, polytrimethylene terephthalate, polytetramethylene terephthalate, polycyclohexylene dimethylene terephthalate, polyethylene-2,6-naphthalenedicarboxylate, and polyethylene-1,2-bis(2-chlorophenoxy) ethane-4, 4'-dicarboxylate. Among them, polyethylene terephthalate, which is most commonly used, or a polyester copolymer mainly containing an ethylene terephthalate unit is preferably used.

In addition, as the polyester-based resin, a single polyester may be used or two or more different polyesters may be used, but when two or more different polyesters are used, from a viewpoint of compatibility of the two or more components, a difference in intrinsic viscosity (IV value) between the polyesters to be used is preferably 0.50 or less, and more preferably 0.30 or less.

In the present invention, the intrinsic viscosity is calculated by the following method.

(1) Dissolve 0.8 g of sample polymer in 10 mL of orthochlorophenol.

(2) Calculate a relative viscosity $\eta_r$ by the following formula using an Ostwald viscometer at a temperature of 25° C. and round off to the second decimal place $$\eta_r = \eta/\eta_0 = (t \times d)/(t_0 \times d_0)$$

Intrinsic viscosity (IV value)=0.0242 $\eta_r$+0.2634 (where $\eta$ represents the viscosity of a polymer solution, $\eta_0$ represents the viscosity of ortho-chlorophenol, t represents a dropping time (seconds) of the solution, d represents the density (g/cm$^3$) of the solution, $t_0$ represents the dropping time (seconds) of ortho-chlorophenol, and $d_0$ represents the density (g/cm$^3$) of ortho-chlorophenol, respectively.).

As the cross-sectional shape of the ultrafine fiber, a circular cross section is preferable from the viewpoint of processing operability, but it is also possible to employ cross-sectional shapes of modified cross section such as an ellipse, a flat shape, polygonal shapes such as a triangular shape, and a fan shape and a cross shape, a hollow shape, a Y shape, a T shape, and a U shape.

The average single fiber diameter of the ultrafine fibers is 1.0 μm or more and 10.0 μm or less. By setting the average single fiber diameter of the ultrafine fibers to 1.0 μm or more, preferably 1.5 μm or more, an excellent effect of color developability after dyeing, light resistance and fastness to rubbing, and stability during spinning is exhibited. On the other hand, when the average single fiber diameter of the ultrafine fibers is 10.0 μm or less, preferably 6.0 μm or less, and more preferably 4.5 μm or less, artificial leather excellent in surface appearance that is dense and has a soft touch is obtained.

In the present invention, the average single fiber diameter of the ultrafine fibers is calculated by taking a scanning electron microscope (SEM) photograph of a cross section of artificial leather, randomly selecting 10 ultrafine fibers having a circular shape or an elliptical shape close to a circular shape, measuring the single fiber diameters, calculating an arithmetic average value of the 10 fibers, and rounding the arithmetic average value off to the first decimal place. However, in a case where ultrafine fibers having a modified cross section are used, first, the cross-sectional area of the single fiber is measured, and the diameter when the cross section is assumed to be circular is calculated to obtain the diameter of the single fiber.

Then, in the artificial leather according to embodiments of the present invention, the ultrafine fibers include polyester containing a manganese-based compound. This makes it possible to obtain artificial leather having excellent tensile/tear strength. Furthermore, this manganese-based compound has an average particle diameter of 0.01 μm or more and 0.20 μm or less, and the ultrafine fibers contain a manganese element in an amount of 0.1 ppm or more and 50.0 ppm or less (0.0001 mass % or more and 0.0050 mass % or less) with respect to 100 mass % of the ultrafine fiber. Since the manganese element existing in an ionic state in the ultrafine fibers is a metal having reducing ability, further oxidative decomposition can be suppressed by, for example, deactivating radicals generated by oxidative decomposition of the island component (for example, polyethylene terephthalate, PET) and the sea component (for example, polystyrene and PST) at the stage of forming the ultrafine fiber, for example, when the sea-island type composite fibers are spun. As a result, the rigidity of the sea-island type composite fibers that are ultrafine fiber-generating fibers can be enhanced. As a result, it becomes difficult to flatten in the thickness direction at an initial stage of needle punching, thus making it possible to increase entanglement efficiency and to manufacture artificial leather excellent in strength.

The particle diameter referred to herein is a particle diameter in a state where the manganese-based compound is existing in aggregation in the ultrafine fiber, and generally refers to a particle diameter that is called a secondary particle diameter.

When the average of particle diameters (hereinafter, sometimes simply referred to as the average particle diameter) is 0.01 μm or more, preferably 0.02 μm or more, more preferably 0.04 μm or more, the manganese-based compound can also be existing at an interface between the island component and the sea component, and the radicals generated by oxidative decomposition can be deactivated. In addition, when the average particle diameter is 0.20 μm or less, preferably 0.18 μm or less, more preferably 0.16 μm or less, the stability during spinning and the yarn strength are excellent.

In addition, when the amount of the manganese element contained in the ultrafine fibers is 0.1 ppm (0.0001 mass %) or more, preferably 0.2 ppm (0.0002 mass %) or more, more preferably 0.3 ppm (0.0003 mass %) or more, still more preferably 0.5 ppm (0.0005 mass %) or more, and particularly preferably 1.0 ppm (0.0010 mass %) or more with respect to 100 mass % of the ultrafine fibers, the rigidity of the ultrafine fibers and the sea-island type composite fibers can be enhanced. In addition, when the amount of the manganese element contained in the ultrafine fibers is 50.0 ppm (0.0050 mass %) or less, preferably 45.0 ppm (0.0045 mass %) or less, more preferably 40.0 ppm (0.0040 mass %) or less, still more preferably 30 ppm (0.0030 mass %) or less with respect to 100 mass % of the ultrafine fiber, the stability during spinning and the yarn strength are excellent.

In the present invention, the average particle diameter is calculated by the following method.

(1) An ultrathin slice having a thickness of 5 to 10 μm is prepared in a cross-sectional direction of a plane perpendicular to a longitudinal direction of the ultrafine fiber.

(2) The fiber cross section in the ultrathin slice is observed by an energy dispersive X-ray spectroscopy (TEM-EDX).

(3) Since X-rays unique to atoms are generated by irradiating an area to be analyzed with an electron beam, the energy and the number of times of generation are measured, and particles containing manganese atoms are identified. All particle diameters of particles containing the identified manganese atoms are measured.

(4) An average value (arithmetic average) is calculated for all the measured particle diameters.

In addition, in the present invention, a mass ratio of the manganese element contained in the ultrafine fibers is measured by the following method.

(1) The artificial leather is sufficiently dissolved in an acid to obtain a sample solution.

(2) The manganese element is measured by an ICP emission spectrophotometer, and the mass ratio of the manganese element is calculated from the mass ratio of the ultrafine fibers in the artificial leather dissolved in the sample solution.

As the manganese-based compound in the present invention, a manganese acetate, a manganese nitrate, a manganese sulfate, a manganese chloride, and the like can be used. From viewpoints of excellent solubility and catalytic activity, the manganese-based compound is preferably the manganese acetate.

In embodiments of the present invention, it is preferable that the polyester-based resin constituting the ultrafine fibers contains a phosphorus-based compound from viewpoints of wet heat resistance and heat resistance in order to bring charge of the entire ultrafine fibers closer to 0 with respect to the manganese present in an ionic state, and it is preferable that the manganese element molar equivalent A contained in the ultrafine fibers and the phosphorus element molar equivalent B contained in the ultrafine fibers satisfy the relationship of the molar ratio of the following formula (I).

$$20 \leq B/A \leq 200 \quad \text{Formula (I).}$$

When a molar ratio (B/A) of the phosphorus element molar equivalent B contained in the ultrafine fibers to the manganese element molar equivalent A contained in the ultrafine fibers is 20 or more (20≤B/A, and the same applies hereinafter), more preferably 25 or more, and still more preferably 30 or more, the charge of the entire ultrafine fibers can be made close to 0 with respect to manganese existing in an ionic state, and thus stable. In addition, when the molar ratio (B/A) of the phosphorus element molar equivalent B contained in the ultrafine fibers to the manganese element molar equivalent A contained in the ultrafine fibers is 200 or less (B/A≤200, and the same applies hereinafter), more preferably 150 or less, still more preferably 120 or less, and particularly preferably 90 or less, the stability during spinning and the yarn strength are excellent.

In the present invention, the mass ratio of the phosphorus element contained in the ultrafine fibers is measured by the following method, and the measured mass ratio of the phosphorus element and the mass ratio of the manganese element are each converted in terms of moles, and B/A can be calculated by dividing the phosphorus element molar equivalent B by the manganese element molar equivalent A.

(1) The artificial leather is sufficiently dissolved in an acid to obtain a sample solution.

(2) The phosphorus element is measured by the 0 emission spectrophotometer, and the mass ratio of the phosphorus element is calculated from the mass ratio of the ultrafine fibers in the artificial leather dissolved in the sample solution.

As the phosphorus-based compound in the present invention, a phosphoric acid, a trimethyl phosphate, a sodium dihydrogen phosphate, a disodium hydrogen phosphate, a trisodium phosphate, and the like can be used. Among them, the phosphorus-based compound is preferably the trimethyl phosphate or the sodium dihydrogen phosphate from a viewpoint of excellent hydrolysis resistance.

In the present invention, the ultrafine fibers preferably further contain the carbon black. The carbon black is easy to obtain a black pigment having a fine particle diameter, and is excellent in dispersibility in polymers. Therefore, when the ultrafine fibers further contain the carbon black, excellent color fastness, abrasion resistance, and strength can be achieved while having an excellent dark color and uniform color developability.

Note that, in addition to the carbon black, inorganic particles such as titanium oxide particles, a lubricant, a heat stabilizer, a UV absorber, a conductive agent, a heat storage agent, an antibacterial agent, and the like can be added to the polyester-based resin forming the ultrafine fibers in accordance with various purposes as long as the object of the present invention is not hindered.

In the artificial leather according to embodiments of the present invention, a fiber-entangled body containing a nonwoven fabric including ultrafine fibers that are made of the polyester-based resin as a constituent element is one of the constituent elements.

In the present invention, a "fiber-entangled body including a nonwoven fabric as a constituent element" refers to an aspect in which the fiber-entangled body is a nonwoven fabric, an aspect in which the fiber-entangled body is formed by entangling and integrating a nonwoven fabric and a woven fabric as described later, an aspect in which the fiber-entangled body is formed by entangling and integrating a nonwoven fabric and a substrate other than a woven fabric, and the like.

Forming the fiber-entangled body including a nonwoven fabric as a constituent element makes it possible to provide an appearance and a feel that are uniform and elegant when the surface is buffed.

Examples of the form of the nonwoven fabric include a long fiber nonwoven fabric mainly including filaments as well as a short fiber nonwoven fabric mainly including fibers of 100 mm or less. In a case where the long fiber nonwoven fabric is used as a fibrous substrate, artificial leather having excellent strength can be obtained, which is thus preferable. On the other hand, as compared with a case of the long fiber nonwoven fabric, in a case of the short fiber nonwoven fabric, the number of fibers oriented in the thickness direction of the artificial leather can be increased, and the surface of the artificial leather when buffed can have a highly dense feeling.

In a case where the short fiber nonwoven fabric is used, a fiber length of the ultrafine fibers is preferably 25 mm or more and 90 mm or less. When the fiber length is 90 mm or less, more preferably 80 mm or less, and still more preferably 70 mm or less, a good surface appearance and feel is obtained. On the other hand, when the fiber length is 25 mm or more, more preferably 35 mm or more, and still more preferably 40 mm or more, artificial leather excellent in abrasion resistance can be provided.

A basis weight of the nonwoven fabric constituting the artificial leather according to the present invention is measured according to "6.2 Mass per Unit Area (ISO method)" in "Test methods for nonwovens" of JIS L 1913:2010, and is preferably in a range of 50 g/m$^2$ or more and 600 g/m$^2$ or less. When the basis weight of the nonwoven fabric is 50 g/m$^2$ or more and more preferably 80 g/m$^2$ or more, artificial leather having a sense of fulfillment and an excellent feel can be provided. On the other hand, when the basis weight of the nonwoven fabric is 600 g/m$^2$ or less and more preferably 500 g/m$^2$ or less, a soft artificial leather excellent in moldability can be provided.

In the artificial leather of the present invention, for improving the strength and shape stability of the artificial leather, it is preferable to laminate, entangle and integrate a woven fabric inside or on one side of the nonwoven fabric.

As the type of fiber constituting the woven fabric used in a case where the woven fabric is entangled and integrated, it is preferable to use a filament yarn, a spun yarn, a mixed composite yarn of the filament yarn and the spun yarn, and the like, and it is more preferable to use a multifilament made of a polyester-based resin or a polyamide-based resin from viewpoints of durability, particularly mechanical strength, and the like.

In addition, from viewpoints of mechanical strength and the like, it is preferable that the fibers constituting the woven fabric do not contain inorganic particles.

When the average single fiber diameter of the fibers constituting the woven fabric is preferably 50.0 μm or less, more preferably 15.0 μm or less, and still more preferably 13.0 μm or less, artificial leather excellent in flexibility is obtained, and even when the fibers of the woven fabric are exposed on the surface of the artificial leather, a hue difference from the ultrafine fibers containing the pigment after dyeing is also reduced, so that hue uniformity on the surface is not impaired. On the other hand, when the average single fiber diameter is preferably 1.0 μm or more, more preferably 8.0 μm or more, and still more preferably 9.0 μm or more, the shape stability of a product as artificial leather is improved.

In the present invention, the average single fiber diameter of fibers constituting a woven fabric is determined by taking a scanning electron microscope (SEM) photograph of the cross section of the artificial leather, randomly selecting 10 fibers constituting the woven fabric, measuring the single fiber diameter of the fibers, calculating the arithmetic average value of the 10 fibers, and rounding the arithmetic average value off to the first decimal place.

When the fibers constituting the woven fabric are multifilaments, a total fineness of the multifilaments is measured according to "8.3.1 Fineness based on corrected mass b) Method B (simple method)" in "8.3 Fineness" of JIS L 1013:2010 "Chemical fiber filament yarn test method", and is preferably 30 dtex or more and 170 dtex or less.

When the total fineness of the yarns constituting the woven fabric is 170 dtex or less, the artificial leather excellent in flexibility is obtained. On the other hand, it is preferable when the total fineness is 30 dtex or more, in which case not only the shape stability of a product as artificial leather is improved, but also the fibers constituting the woven fabric are less likely to be exposed on the surface of the artificial leather when the nonwoven fabric and the woven fabric are entangled and integrated by needle punching or the like. At this time, the total fineness of the multifilaments of warps and wefts is preferably the same.

Furthermore, the yarns constituting the woven fabric preferably have a twist count of 1000 T/m or more and 4000 T/m or less. When the twist count is 4000 T/m or less, more preferably 3500 T/m or less, and still more preferably 3000 T/m or less, the artificial leather excellent in flexibility is obtained. When the twist count is 1000 T/m or more, more preferably 1500 T/m or more, and still more preferably 2000 T/m or more, in a case where a nonwoven fabric and a woven fabric are entangled and integrated by needle punching or the like, damage to fibers constituting the woven fabric can be prevented, and mechanical strength of the artificial leather is excellent, which is thus preferable.

[Elastic Polymer]

Since the elastic polymer constituting the artificial leather of the present invention is a binder that grips ultrafine fibers constituting the artificial leather, polyurethane is preferable as the elastic polymer to be used in consideration of a soft feel of the artificial leather of the present invention.

In the present invention, as the polyurethane preferably used as the elastic polymer, either an organic solvent-based polyurethane used in a state of being dissolved in an organic solvent or a water-dispersible polyurethane used in a state of being dispersed in water can be used. In addition, examples of the polyurethane preferably used in embodiments of the present invention include a polyurethane obtained by reaction of a polymer diol, an organic diisocyanate, and a chain extender.

As the polymer diol, for example, a polycarbonate-based diol, a polyester-based diol, a polyether-based diol, a silicone-based diol, and a fluorine-based diol can be used, and a copolymer of a combination of these diols can also be used. Among them, it is a preferred aspect to use the polycarbonate-based diol from viewpoints of hydrolysis resistance and abrasion resistance.

The polycarbonate-based diol can be produced through a transesterification reaction between an alkylene glycol and an ester carbonate, a reaction between a phosgene or a chloroformate and an alkylene glycol, and the like.

In addition, examples of the alkylene glycol include linear alkylene glycols such as ethylene glycol, propylene glycol, 1,4-butanediol, 1,5-pentanediol, 1,6-hexanediol, 1,9-nonanediol, and 1,10 decanediol, branched alkylene glycols such as neopentyl glycol, 3-methyl-1,5-pentanediol, 2,4-diethyl-1,5-pentanediol, and 2-methyl-1,8-octanediol, alicyclic diols such as 1,4-cyclohexanediol, aromatic diols such as bisphenol A, glycerin, trimethylolpropane, and pentaerythritol. In embodiments of the present invention, either the polycarbonate-based diol obtained from a single alkylene glycol or the copolymerized polycarbonate-based diol obtained from two or more kinds of alkylene glycols can be adopted.

In addition, examples of the polyester-based diols include polyester diols produced by condensing one of various low molecular weight polyols and a polybasic acid.

As the low molecular weight polyol, for example, one or two or more polyols selected from a group consisting of ethylene glycol, 1,2-propylene glycol, 1,3-propylene glycol, 1,3-butanediol, 1,4-butanediol, 2,2-dimethyl-1,3-propanediol, 1,6-hexanediol, 3-methyl-1,5-pentanediol, 1,8-octanediol, diethylene glycol, triethylene glycol, dipropylene glycol, tripropylene glycol, cyclohexane-1,4-diol, and cyclohexane-1,4-dimethanol can be used.

In addition, adducts obtained by adding various alkylene oxides to bisphenol A can also be used.

In addition, examples of the polybasic acid include one or two or more polybasic acids selected from a group consisting of a succinic acid, a maleic acid, an adipic acid, a glutaric acid, a pimelic acid, a suberic acid, an azelaic acid, a sebacic acid, a dodecane dicarboxylic acid, a phthalic acid, an isophthalic acid, a terephthalic acid, and a hexahydroisophthalic acid.

Examples of the polyether-based diol used in embodiments of the present invention include a polyethylene glycol, a polypropylene glycol, a polytetramethylene glycol, and copolymerized diols that are formed by combining these substances.

A number average molecular weight of the polymer diol is preferably in a range of 500 or more and 4000 or less in a case where the molecular weight of the polyurethane-based elastomer is constant. When the number average molecular weight is preferably 500 or more, more preferably 1500 or more, it is possible to prevent the artificial leather from becoming stiff. In addition, when the number average molecular weight is preferably 4000 or less and more preferably 3000 or less, the strength as the polyurethane can be maintained.

Examples of the organic diisocyanate preferably used in the present invention include aliphatic diisocyanates such as a hexamethylene diisocyanate, a dicyclohexylmethane diisocyanate, an isophorone diisocyanate, and a xylylene diisocyanate, and aromatic diisocyanates such as a diphenylmethane diisocyanate and a tolylene diisocyanate, and these compounds can also be used in combination.

As the chain extender, amine-based chain extenders such as an ethylenediamine and a methylenebisaniline, and diol-based chain extenders such as an ethylene glycol can be preferably used. In addition, a polyamine obtained by reacting a polyisocyanate with water can also be used as the chain extender.

In the present invention, the polyurethane preferably used as the elastic polymer can be used in combination with a crosslinker for improving water resistance, the abrasion resistance, the hydrolysis resistance, and the like. The crosslinker may be an external crosslinker that is added to the polyurethane as a third component, or an internal crosslinker that introduces reaction points to form a crosslinked structure in advance into a polyurethane molecular structure. It is preferable to use the internal crosslinker from a viewpoint that crosslinking points can be formed more uniformly in the polyurethane molecular structure and that a decrease in flexibility can be reduced.

As the crosslinker, a compound having an isocyanate group, an oxazoline group, a carbodiimide group, an epoxy group, a melamine resin, a silanol group and the like can be used.

In addition, the elastic polymer can contain various additives depending on purposes, for example, flame retardants such as "phosphorus-based, halogen-based and inorganic-based flame retardants," antioxidants such as "phenolic, sulfur, and phosphorus antioxidants," UV absorbers such as "benzotriazole-based, benzophenone-based, salicylate-based, cyanoacrylate-based, and oxalic acid anilide-based UV absorbers," light stabilizers such as "hindered amine-based or benzoate-based light stabilizers," hydrolysis resistance stabilizers such as a polycarbodiimide, a plasticizer, an antistatic agent, a surfactant, a coagulation modifier, the carbon black, a dye, and the like.

In general, the content of the elastic polymer in the artificial leather can be appropriately adjusted in consideration of types of the elastic polymer to be used, methods for producing the elastic polymer, and the feel and physical properties, but in the present invention, the content of the elastic polymer is preferably 10 mass % or more and 60 mass % or less relative to the mass of the fiber-entangled body. When the content of the elastic polymer is 10 mass % or more, more preferably 15 mass % or more, and still more preferably 20 mass % or more, it is possible to enhance a bonding between the fibers by the elastic polymer and to improve the abrasion resistance of the artificial leather. However, when the content of the elastic polymer is 60 mass % or less, more preferably 45 mass % or less, and still more preferably 40 mass % or less, the artificial leather can be made more flexible.

[Artificial Leather]

In the artificial leather according to embodiments of the present invention, it is preferable to have raised nap on the surface. The raised nap may be provided only on one surface of the artificial leather, and is also allowed to be provided on both surfaces. In other words, when a surface on a side having raised nap among surfaces of the artificial leather is a napped surface, at least one surface of the artificial leather may be a napped surface, and surfaces on both sides may be napped surfaces.

As for the form of raised nap in a case where the artificial leather has raised nap on the surface, the raised nap preferably has a length and directional flexibility to such an extent that traces remain when the artificial leather is stroked with a finger, that is, a so-called finger mark remain due to a change of direction of the raised nap from a viewpoint of design effects.

More specifically, a raised nap length on the surface is preferably 200 μm or more and 500 μm or less, and more preferably 250 μm or more and 450 μm or less. When the raised nap length is 200 μm or more, the raised nap on the surface covers the elastic polymer, and exposure of the elastic polymer on the surface of the artificial leather is suppressed, so that the artificial leather excellent in surface appearance and dense feeling can be obtained. In addition, when the woven fabric is entangled and integrated with the nonwoven fabric constituting the artificial leather, setting the raised nap length on the surface within the above range is preferable because the fibers of the woven fabric near the surface of the artificial leather can be sufficiently covered. On the other hand, when the raised nap length is 500 μm or less, the artificial leather excellent in design effects and abrasion resistance can be obtained.

In the present invention, the raised nap length of the artificial leather is calculated by the following method.

(1) A thin slice with a thickness of 1 mm is prepared in the cross-sectional direction of the plane perpendicular to the longitudinal direction of the artificial leather in a state where the raised nap of the artificial leather is ruffed by using a lint brush or the like.
(2) The cross section of the artificial leather is observed with a scanning electron microscope (SEM) at 90 times.
(3) In an SEM image photographed, a height of a napped portion (a layer including only the ultrafine fibers) is measured at 10 points at intervals of 200 μm in a width direction of the cross section of the artificial leather.
(4) An average value (arithmetic average) is calculated for the measured height of the napped portion (the layer including only the ultrafine fibers) at 10 points.

In the artificial leather according to embodiments of the present invention, the ratio of the raised nap covering the napped surface of the artificial leather (raised nap coverage) is preferably 50% or more and 100% or less. When the raised nap coverage is 50% or more, the exposure of the elastic polymer on the surface of the artificial leather can be suppressed, and thus artificial leather excellent in surface appearance and dense feeling can be obtained. In embodiments of the present invention, by setting the average value and the content of the particle diameter of the manganese-based compound contained in the raised nap (the ultrafine fibers) within the prescribed ranges, the yarn strength of the raised nap (the ultrafine fibers) can be increased, and thus the artificial leather can be obtained in which fibers are less likely to fall off due to rubbing even when the raised nap coverage is as high as 50% or more.

The raised nap coverage refers to a value obtained by enlarging the napped surface at an observation magnification of 30 times to 90 times such that the presence of raised nap can be recognized by SEM, and calculating a ratio of a total area of the napped portion per total area of 9 $mm^2$ using image analysis software. The ratio of the total area can be calculated by binarizing the SEM image photographed using, for example, "ImageJ", an image analysis software developed by National Institutes of Health (NIH) in such a manner that the napped portion and a non-napped portion are set to a threshold value of 100. In addition, in the calculation of the raised nap coverage, in a case where a substance that is not a raised nap is calculated as the raised nap and greatly affects the raised nap coverage, the image is manually edited and the portion is calculated as a non-napped portion.

As the image analysis system, the image analysis software "ImageJ" described above is exemplified, but the image analysis system is not limited to the image analysis software "ImageJ" as long as the image analysis system includes image processing software having a function of calculating a specified area ratio of pixels. Note that the image processing software "ImageJ" is common software, and was developed by the National Institutes of Health. The image processing software "ImageJ" has a function of specifying a necessary region and performing pixel analysis on the captured image.

The artificial leather according to embodiments of the present invention preferably has a thickness of 0.2 mm or more and 1.2 mm or less as measured according to "6.1.1 A method" in "6.1 Thickness (ISO method)" of JIS L 1913: 2010 "General nonwoven fabric test method". When the thickness of the artificial leather is 0.2 mm or more, more preferably 0.3 mm or more, and still more preferably 0.4 mm or more, not only excellent workability during manufacturing is obtained, but also a sense of fulfillment and excellent feel are obtained. On the other hand, when the thickness is 1.2 mm or less, more preferably 1.1 mm or less, and still more preferably 1.0 mm or less, the soft artificial leather excellent in moldability can be provided.

In addition, in the artificial leather of the present invention, in an abrasion resistance test measured by "8.19.5 E method (Martindale method)" in "8.19 Abrasion strength and rubbing discoloration property" of JIS L 1096:2010 "Fabric test method for woven and knitted fabrics," a weight loss of the artificial leather after abrasion is performed 20,000 times under a pressing load of 12.0 kPa is preferably 10 mg or less, more preferably 9 mg or less, and still more preferably 8.5 mg or less. When the weight loss is 10 mg or less, it is possible to prevent contamination due to fluff dropping during actual use.

In addition, in the artificial leather of the present invention, the tensile strength measured according to "6.3.1 Tensile strength and elongation (ISO method)" of JIS L 1913:2010 "General nonwoven fabric test method" is preferably 20 to 200 N/cm in an arbitrary measurement direction.

When the tensile strength is 20 N/cm or more, more preferably 30 N/cm or more, and still more preferably 40 N/cm or more, the artificial leather is excellent in shape stability and durability, which is preferable. In addition, when the tensile strength is 200 N/cm or less, more preferably 180 N/cm or less, and still more preferably 150 N/cm or less, the artificial leather excellent in moldability is provided.

[Method for Manufacturing Artificial Leather]

The method for manufacturing the artificial leather according to embodiments of the present invention is preferably as follows. In other words, a method includes:

a sea-island type composite fiber forming step of performing sea-island type composite spinning using a polyester-based resin containing a manganese-based compound having an average particle diameter of 0.01 μm or more and 0.20 μm or less as an island component and a thermoplastic resin having different solvent solubility from that of the island component as a sea component;

a fiber-entangled body forming step of forming a fiber-entangled body including the sea-island type composite fibers;

an ultrafine fiber forming step of dissolving and removing the sea component from the sea-island type composite fibers to form ultrafine fibers having an average single fiber diameter of 1.0 μm or more and 10.0 μm or less; and an elastic polymer applying step of applying an elastic polymer to the fiber-entangled body. Hereinafter, details of each step will be described.

<Step of Forming Sea-Island Type Composite Fibers>

In the present step, ultrafine fiber-generating fibers are produced by performing sea-island type composite spinning using a polyester-based resin containing a manganese-based compound having an average particle diameter of 0.01 μm or more and 0.20 μm or less as an island component and a thermoplastic resin having different solvent solubility from that of the island component as a sea component.

As the ultrafine fiber-generating fibers, sea-island type composite fibers are used in which thermoplastic resins having different solvent solubility are used as a sea component (easily soluble polymer) and an island component (difficultly soluble polymer), and the sea component is dissolved and removed using a solvent or the like to cause the island component to form the ultrafine fibers. A use of the sea-island type composite fibers is preferable from viewpoints of the feel and surface appearance of the artificial leather because appropriate voids can be applied between the island components when removing the sea component, that is, between the ultrafine fibers inside a fiber bundle.

As the method of spinning the ultrafine fiber-generating fibers having a sea-island type composite structure, a method using a mutually arranged polymer body in which a spinneret for sea-island type composite fibers is used and the fibers are spun by mutually arranging the sea component and the island component is preferred from a viewpoint that ultrafine fibers having a uniform single fiber fineness are obtained.

When a polyester-based resin containing a manganese-based compound having an average particle diameter of 0.01 μm or more and 0.20 μm or less is used as the island component, it is preferable to form a chip by kneading the manganese-based compound with the polyester-based resin in advance. In this way, the amount of the manganese-based compound contained in the chips can be easily adjusted, and the amount of the manganese-based compound contained in the sea-island type composite fibers and the ultrafine fibers and the average particle diameter of the manganese-based compound can also be easily adjusted. The content of the manganese-based compound at this time is preferably kneaded so as to contain a manganese element of 0.1 ppm or more and 50.0 ppm or less (0.0001 mass % or more and 0.0050 mass % or less) relative to 100 mass % of the polyester-based resin.

In addition, it is also preferable that the island component to be ultrafine fibers in a subsequent step contains a phosphorus-based compound, and it is also more preferable that the manganese element molar equivalent A contained in the polyester-based resin and the phosphorus element molar equivalent B contained in the polyester-based resin satisfy the relationship of the molar ratio of the following formula (I) from the above reasons.

$$20 \leq B/A \leq 200 \quad (I).$$

As the sea component of the sea-island type composite fibers, a polyethylene, a polypropylene, a polystyrene, a copolymerized polyester obtained by copolymerizing sodium sulfoisophthalic acid, a polyethylene glycol, or the like, a polylactic acid, or the like can be used, but the polystyrene or the copolymerized polyester is preferably used from viewpoints of yarn manufacturing property, easy elution, and the like.

In the method for manufacturing the artificial leather of the present invention, it is preferable to use the sea-island type composite fibers in which the strength of the island component is 2.0 cN/dtex or more. When the strength of the island component is 2.0 cN/dtex or more, more preferably 2.3 cN/dtex or more, and still more preferably 2.8 cN/dtex or more, the abrasion resistance of the artificial leather is improved, and a decrease in color fastness to rubbing due to falling off of the fiber can be suppressed.

In the present invention, the strength of the island component of the sea-island type composite fibers is calculated by the following method.

(1) Ten sea-island type composite fibers having a length of 20 cm are bundled.

(2) The sea component is dissolved and removed from the sample of (1), and an air drying is performed.

(3) The test is performed 10 times (N=10) under conditions of a gripping length of 5 cm, a tensile speed of 5 cm/min, and a load of 2 N according to "8.5.1 Standard time test" in "8.5 Tensile strength and elongation" of JIS L 1013:2010 "Chemical fiber filament yarn test method".

(4) The value obtained by rounding the arithmetic average value (cN/dtex) of the test results obtained in (3) to the first decimal place is taken as the strength of the island component of the sea-island type composite fibers.

<Step of Forming Fiber-Entangled Body>

In the present step, the spun ultrafine fiber-generating fibers are opened and then formed into a fiber web by a cross wrapper or the like, and entangled to obtain the fiber-entangled body containing the nonwoven fabric as the constituent element. As a method of entangling the fiber webs to obtain a fiber-entangled body containing the nonwoven fabric as the constituent element, needle punching, water jet punching, or the like can be used.

As a form of the nonwoven fabric, either the short fiber nonwoven fabric or the long fiber nonwoven fabric can be used as described above, but in a case of the short fiber nonwoven fabric, the number of fibers oriented in the thickness direction of the artificial leather is larger than that of the long fiber nonwoven fabric, and a highly dense feeling can be obtained on the surface of the artificial leather when buffing.

In a case where the short fiber nonwoven fabric is used as a nonwoven fabric, the sea-island type composite fibers obtained in the step of forming the sea-island type composite fibers is preferably crimped, cut into a predetermined length to obtain raw cotton, and then opened, laminated, and entangled to obtain a short fiber nonwoven fabric. Known methods can be used for crimping and cutting.

Furthermore, when the fiber-entangled body includes a woven fabric, the nonwoven fabric obtained by the above method and the woven fabric are laminated and then entangled and integrated. For the entanglement and integration of the nonwoven fabric and the woven fabric, the woven fabric can be laminated on one surface or both surfaces of the nonwoven fabric, or fibers of the nonwoven fabric and the woven fabric can be entangled by needle punching, water jet punching, or the like after the woven fabric is sandwiched between a plurality of nonwoven fabric webs.

An apparent density of the nonwoven fabric including sea-island type composite fibers after the needle punching or the water jet punching is preferably 0.15 g/cm$^3$ or more and 0.45 g/cm$^3$ or less. When the apparent density is preferably 0.15 g/cm$^3$ or more, the artificial leather should have sufficient shape stability and dimensional stability. On the other hand, when the apparent density is preferably 0.45 g/cm$^3$ or less, a sufficient space for applying the elastic polymer can be kept.

In a preferred aspect, the fiber-entangled body is subjected to a heat shrinkage treatment with warm water or steam in order to improve the dense feeling of the fibers.

Next, the fiber-entangled body may be impregnated with an aqueous solution of a water soluble resin, and dried to apply the water soluble resin. Applying the water soluble resin to the fiber-entangled body improves the fibers are fixed and the dimensional stability.

<Step of Forming Ultrafine Fibers>

In this step, the obtained fibrous substrate is treated with a solvent to form ultrafine fibers having an average single fiber diameter of single fibers of 1.0 μm or more and 10.0 μm or less.

The formation of the ultrafine fibers can be performed by immersing the fiber-entangled body in a solvent to dissolve and remove the sea component of the sea-island type composite fibers.

In a case where the sea component is a polyethylene, a polypropylene, or a polystyrene, an organic solvent such as a toluene or a trichloroethylene can be used as the solvent for dissolving and removing the sea component. In addition, in a case where the sea component is copolymerized polyester or polylactic acid, an aqueous alkali solution such as a sodium hydroxide or the like can be used. Also, in a case where the sea component is a water soluble thermoplastic polyvinyl alcohol-based resin, hot water can be used.

<Step of Applying Elastic Polymer>

In this step, a fiber-entangled body including ultrafine fibers or sea-island type composite fibers as a main component is impregnated with a solution of an elastic polymer, and the elastic polymer is solidified to apply an elastic polymer. As a method of solidifying the elastic polymer, there is a method of impregnating a fiber-entangled body with a solution of the elastic polymer and then performing wet coagulation or dry coagulation, and these methods can be appropriately selected depending on the types of the elastic polymer to be used.

As the solvent used in a case where the polyurethane is selected as the elastic polymer, an N,N'-dimethylformamide, a dimethyl sulfoxide, or the like is preferably used. In addition, a water-dispersible polyurethane liquid in which the polyurethane is dispersed in water as an emulsion may be used.

Note that the elastic polymer may be applied to the fiber-entangled body before the ultrafine fibers are generated from the sea-island type composite fibers, or after the ultrafine fibers are generated from the sea-island type composite fibers.

<Step of Cutting Artificial Leather in Half and Grinding>

From a viewpoint of manufacturing efficiency, it is also a preferable aspect that after completion of the steps above, the artificial leather provided with the elastic polymer is cut in half in the thickness direction to form two pieces of artificial leather.

Furthermore, a buffing treatment is performed on the surface of the artificial leather or the half-cut artificial leather to which the elastic polymer is applied. The buffing treatment can be performed by a grinding method using sandpaper, a roll sander, or the like. The buffing treatment can be applied to only one surface or both surfaces of the artificial leather.

In a case where the buffing treatment is performed, a lubricant such as silicone emulsion can be applied to the surface of the artificial leather before the buffing treatment. In addition, by applying an antistatic agent before the buffing treatment, a grinding powder generated from the artificial leather by grinding is less likely to be deposited on the sandpaper. In this way, artificial leather is formed.

<Step of Dyeing Artificial Leather>

As a dyeing treatment, for example, a jet dyeing treatment using a jigger dyeing machine or a jet dyeing machine, a dip dyeing treatment such as a thermosol dyeing treatment using a continuous dyeing machine, or a textile printing treatment on a raised nap surface by roller textile printing, screen textile printing, inkjet textile printing, sublimation textile printing, vacuum sublimation textile printing, or the like can be used. Among them, it is preferable to use a jet dyeing machine from the viewpoint of quality and surface appearance because the soft feel can be obtained. In addition, various resin finishing processes can be performed after dyeing as necessary.

<Post-Processing Step>

In addition, designability can be imparted to a surface of the artificial leather as necessary. For example, post-processing processing such as drilling such as perforation, embossing, laser processing, pin sonic processing, and print processing can be performed.

The artificial leather of the present invention obtained by the manufacturing method exemplified above has a soft touch like natural leather and excellent strength, surface appearance, and a dense feeling, and can be widely used from furniture, chairs, and vehicle interior materials to clothing applications, and is particularly suitably used for the vehicle interior materials due to its excellent strength.

EXAMPLES

Next, the artificial leather of the present invention will be described more specifically with reference to Examples, but the present invention is not limited to these Examples. Next, an evaluation method used in Examples and measurement conditions thereof will be described. However, in the measurement of each physical property, unless otherwise described, the measurement is performed based on the methods described above.

[Measurement Method and Processing Method for Evaluation]

(1) Average Single Fiber Diameter (μm) of Ultrafine Fibers:

In the measurement of the average single fiber diameter of the ultrafine fibers, the ultrafine fibers were observed using a "VHX-D500/D510 type" scanning electron microscope manufactured by Keyence Corporation, and the average single fiber diameter was calculated by the method described above.

(2) Average Particle Diameter (μm) of Manganese-Based Compound Contained in Ultrafine Fibers:

The measurement was performed by the method described above. Note that the ultrathin slice in the cross-sectional direction of the plane perpendicular to the longitudinal direction of the ultrafine fibers was produced by the method described above using an ultramicrotome "MT6000 type" manufactured by Sorvall. The obtained slice was observed by the method described above using a transmission electron microscope ("H7700 type" manufactured by Hitachi High-Technologies Corporation). Next, the particle diameter of the manganese-based compound was measured for all the observed particles using image analysis software ("WinROOF" manufactured by Mitani Corporation).

(3) Mass Ratio (Ppm) of Manganese Element Contained in Ultrafine Fiber:

The mass ratio of the manganese element contained in the ultrafine fibers was measured by the method described above using an ICP emission spectrometer "PS3520VDD II" manufactured by Hitachi High-Tech Science Corporation, and the mass ratio was calculated and converted to moles.

(4) Mass Ratio (Ppm) of Phosphorus Element Contained in Ultrafine Fiber:

The mass ratio of phosphorus element contained in the ultrafine fibers was measured by the method described above using the ICP emission spectrophotometer "PS3520VDD II" manufactured by Hitachi High-Tech Science Corporation, and the mass ratio was calculated and converted to moles.

(5) Compression Recovery Rate of Fibrous Web (%):

The compression recovery rate of the fibrous web was measured according to JIS L 1097:1982 "Synthetic fiber wadding test method" except that a flat plate of 20×20 cm and 0.93 g/cm$^2$ was used as a thick plate to be placed on a test piece. A compression recovery rate of 85% or more was regarded as having good performance.

(6) Raised Nap Coverage of Artificial Leather Surface (%):

In the measurement of the raised nap coverage described above, "VHX-D500/D510 type" manufactured by Keyence Corporation was used as a scanning electron microscope, and "ImageJ" (National Institutes of Health) was used as image analysis software.

(7) Raised Nap Length of Artificial Leather (μm):

In the measurement of the raised nap length of the artificial leather described above, "VHX-D500/D510 type" manufactured by Keyence Corporation was used as a scanning electron microscope.

(8) Abrasion Resistance of Artificial Leather:

An abrasion resistance test was performed using "Model 406" manufactured by James H. Heal & Co. Ltd., as an abrasion tester and "Abrastive CLOTH SM25" manufactured by James H. Heal & Co. Ltd., as a standard rubbing cloth, and artificial leather in which an abrasion loss of the artificial leather was 10 mg or less was regarded as an acceptable artificial leather.

(9) Tensile Strength of Artificial Leather:

Two test pieces of 2 cm×20 cm were sampled in an arbitrary direction of the artificial leather, and the tensile strength specified in accordance with "6.3.1 Tensile strength and elongation (ISO method)" of JIS L 1913:2010 "General nonwoven fabric test method" was measured. For the measurement, the average of two sheets was taken as the tensile strength of the sheet-shaped article.

(10) Surface Appearance of Sheet-Shaped Article:

The surface appearance of the sheet-shaped article was evaluated by a total of 20 evaluators consisting of 10 healthy adult men and 10 healthy adult women, and the following evaluations were visually distinguished, and the most common evaluation was taken as the surface appearance of the sheet-shaped article. In a case where the number of evaluations was the same, the higher evaluation was taken as the surface appearance of the sheet-shaped article. A good level of the invention was "A or B."

A: Very uniform surface appearance
B: Uniform surface appearance
C: Surface appearance with large variation
D: Surface appearance with very large variation.

(11) Dense Feeling of Sheet-Shaped Article:

The dense feeling of the sheet-shaped article was evaluated by a total of 20 evaluators consisting of 10 healthy adult men and 10 healthy adult women, and the following evaluations were discriminated by the sense of touch, and the most common evaluation was taken as the dense feeling of the sheet-shaped article. In a case where the number of evaluations was the same, the higher evaluation was taken as the dense feeling of the sheet-shaped article. A good level of the invention was "A or B."

A: Very uniform dense feeling
B: Uniform dense feeling
C: Dense feeling with large variation
D: Dense feeling with very large variation.

[Polyethylene Terephthalate]

Polyethylene terephthalates A to K used in the following Examples and Comparative Examples are obtained by adding manganese (II) acetate tetrahydrate having an average particle diameter as shown in Table 1, phosphoric acid, trimethyl phosphate, and, for polyethylene terephthalate F, further carbon black so as to have contents (the content was calculated by ICP measurement assuming that the total content of polyethylene terephthalate, manganese (II) acetate tetrahydrate, phosphoric acid, trimethyl phosphate, and the carbon black was 100 mass %, provided that the content of phosphoric acid and trimethyl phosphate was calculated from the ratio of the content of phosphorus to the added amount of each component) as shown in Table 1. Note that in Table 1, polyethylene terephthalate A is described as "PET A", and the same applies to polyethylene terephthalates B to K. In addition, the intrinsic viscosity (IV value) is a measured value after the addition of the manganese (II) acetate or the like described above.

TABLE 1

| | Intrinsic viscosity (IV value) [−] | Average particle diameter [μm] | Content [ ppm] | | | |
|---|---|---|---|---|---|---|
| | | Manganese (II) acetate tetrahydrate | Manganese (II) acetate tetrahydrate | Phosphoric acid | Trimethyl phosphate | Carbon black |
| PET A | 0.73 | 0.01 | 13.0 | 56.0 | 201.3 | — |
| PET B | 0.73 | 0.01 | 13.0 | 7.2 | 103.5 | — |
| PET C | 0.73 | 0.01 | 5.3 | 618.2 | 201.3 | — |
| PET D | 0.73 | 0.01 | 5.3 | 210.2 | 201.3 | — |
| PET E | 0.73 | 0.01 | 13.0 | — | — | — |
| PET F | 0.73 | 0.01 | 13.0 | 56.0 | 201.3 | 1.0 |
| PET G | 0.73 | — | — | 56.0 | 201.3 | — |
| PET H | 0.73 | 0.0008 | 5.3 | 613.4 | 201.3 | — |
| PET I | 0.73 | 0.02 | 13.0 | 124.5 | 53.1 | — |
| PET J | 0.73 | 0.01 | 0.18 | 6.8 | 103.5 | — |
| PET K | 0.73 | 0.01 | 267.3 | 2452.8 | 201.3 | — |

Example 1

<Step of Forming Sea-Island Type Composite Fibers>

Sea-island type composite fibers having a sea-island type composite structure composed of an island component and a sea component were melt-spun under the following conditions.

Island component: polyethylene terephthalate A

Sea component: polystyrene having an MFR (melt flow rate, measured by test method specified in ISO 1133: 1997) of 65 g/10 min Sinneret: spinneret for sea-island type composite fibers having 16 islands/hole Spinning temperature: 285° C.

Mass ratio of island component/sea component:80/20

Discharge amount: 1.2 g/(minute·hole)

Spinning speed: 1100 m/min.

Then, the sea-island type composite fibers were stretched 2.81 times in a steam box at 150° C.

<Step of Forming Fiber-Entangled Body>

First, the sea-island type composite fibers obtained as described above were crimped using a push-in crimping machine, and then cut into a length of 51 mm to form a sea-island type composite fiber web having a single fiber fineness of 4.2 dtex. The average single fiber diameter of the ultrafine fibers obtained from the sea-island type composite fibers was 4.4 μm, the strength of the ultrafine fibers was 3.5 cN/dtex, the average particle diameter of the manganese-based compound in the ultrafine fibers was 0.10 μm, the manganese element content was 3.6 ppm, and the molar ratio (B/A, and the same applies hereinafter) of the phosphorus element molar equivalent (B) to the manganese element molar equivalent (A) was 22.2.

Then, using the sea-island type composite fiber web obtained as described above, a laminated web was formed through carding and cross wrapper processes. Then, needle punching was performed with the number of punches of 2500/cm$^2$ to obtain a nonwoven fabric (fiber-entangled body) having a basis weight of 440 g/m$^2$ and a thickness of 1.94 mm. Here, the compression recovery rate of the fiber-entangled body was 89.3%, fibers were unlikely to flatten in the thickness direction of the fiber-entangled body at the initial stage of needle punching, and the entanglement property could be enhanced.

<Step of Forming Ultrafine Fibers>

The nonwoven fabric obtained as described above was shrunk with hot water at 96° C. Thereafter, a fiber-entangled body shrunk with hot water was impregnated with a polyvinyl alcohol (which hereinafter may be abbreviated as PVA) aqueous solution having a saponification degree of 88%, which was prepared so as to have a concentration of 12 mass %. Furthermore, this was squeezed with rollers and dried by hot air at a temperature of 125° C. for 10 minutes while allowing for migration of PVA, to obtain a PVA-attached sheet in which the mass of the PVA relative to the mass of the sheet was 45 mass %. A step of immersing the PVA-attached sheet thus obtained in trichloroethylene and squeezing and compressing the PVA-attached sheet by a mangle was performed 10 times. Thus, the sea component was dissolved and removed (dissolution) and the PVA-attached sheet was compressed to obtain a PVA-attached sheet in which ultrafine fiber bundles were entangled.

<Step of Applying Elastic Polymer>

A dimethylformamide (which hereinafter may be abbreviated as DMF) solution of polyurethane prepared so that the concentration of a solid content containing polyurethane as a main component was 12 mass % was immersed in the PVA-attached sheet obtained as described above. Thereafter, the PVA-attached sheet immersed in the DMF solution of polyurethane was squeezed with rollers. Then, the sheet was immersed in a DMF aqueous solution having a concentration of 30 mass % to solidify the polyurethane. Thereafter, PVA and DMF were removed with hot water, impregnated with a silicone oil emulsion liquid adjusted to a concentration of 1 mass %, a silicone-based lubricant was applied so that the application amount was 0.5 mass % relative to the total mass of the mass of the fiber-entangled body and the mass of the polyurethane, and dried with hot air at a temperature of 120° C. for 10 minutes. As a result, a polyurethane-attached sheet having a thickness of 1.4 mm and a polyurethane mass of 34 mass % relative to the mass of the fiber-entangled body was obtained.

<Half-Cutting and Buffing Step>

The polyurethane-attached sheet obtained as described above was cut in half such that the thickness of each part was ½. Subsequently, a buffing treatment was performed by grinding a surface layer portion of the half-cut surface by 0.25 mm with an endless sandpaper having a sandpaper count of 240 to obtain a napped sheet having a thickness of 0.45 mm.

<Dyeing and Finishing Step>

The napped sheet obtained as described above was dyed using a jet dyeing machine. Thereafter, a drying treatment was performed at 100° C. for 7 minutes to obtain artificial leather having an average single fiber diameter of the ultrafine fibers of 4.4 μm, a basis weight of 175 g/m$^2$, a thickness of 0.55 mm, a raised nap coverage of 85%, and a raised nap length of 330 μm. The obtained artificial leather had excellent abrasion resistance and high strength, and had excellent surface appearance and a dense feeling. The results are shown in Table 2.

Example 2

A laminated web was formed through carding and cross wrapper processes using the sea-island type composite fiber web described in Example 1, and then a plain woven fabric (basis weight: 75 g/m$^2$) having a warp density of 95 yarns/2.54 cm and a weft density of 76 yarns/2.54 cm, in which a twisted yarn obtained by twisting multifilaments (average single fiber diameter: 11 μm, total fineness: 84 dtex, 72 filaments) containing polyethylene terephthalate having an intrinsic viscosity (IV value) of 0.65 at 2500 T/m was used for both wefts and warps, was laminated on and under the laminated web. Thereafter, artificial leather in which the average single fiber diameter of ultrafine fibers was 4.4 μm, the basis weight was 320 g/m$^2$, the thickness was 0.9 mm, the raised nap coverage was 85%, and the raised nap length was 330 μm was obtained in the same manner as in Example 1 except that the needle punching was performed with the number of punches of 2500/cm$^2$ to obtain a fiber-entangled body having a basis weight of 700 g/m$^2$ and a thickness of 3.0 mm. The provided artificial leather had excellent abrasion resistance and very high strength, and had excellent surface appearance and a dense feeling. The results are shown in Table 2.

Example 3

Artificial leather in which the compression recovery rate of the fibrous web was 87.3%, the strength of ultrafine fibers was 3.1 cN/dtex, the average particle diameter of a manganese-based compound in the ultrafine fibers was 0.16 μm, the manganese element content was 3.6 ppm, and the molar ratio (B/A) of the phosphorus element molar equivalent to the manganese element molar equivalent was 11.7 was obtained in the same manner as in Example 1 except that polyethylene terephthalate B was used instead of polyethylene terephthalate A as an island component. The obtained artificial leather was slightly inferior in abrasion resistance and strength, but had excellent surface appearance and a dense feeling. The results are shown in Table 2.

Example 4

Artificial leather in which the compression recovery rate of the fibrous web was 85.4%, the strength of ultrafine fibers was 2.8 cN/dtex, the average particle diameter of a manganese-based compound in the ultrafine fibers was 0.04 μm, the manganese element content was 1.2 ppm, and the molar ratio (B/A) of the phosphorus element molar equivalent to the manganese element molar equivalent was 140.3 was obtained in the same manner as in Example 1 except that polyethylene terephthalate C was used instead of polyethylene terephthalate A as an island component. The obtained artificial leather was slightly inferior in the abrasion resistance and strength, but had excellent surface appearance and highly dense feeling. The results are shown in Table 2.

Example 5

Artificial leather was obtained in the same manner as in Example 1 except that sea-island type composite fibers having a sea-island type composite structure composed of an island component and a sea component were melt-spun under the following conditions, and then the ultrafine fiber-generating fibers were stretched 3.4 times in a spinning oil solution bath at 90° C.

Island component: polyethylene terephthalate A

Sea component: polystyrene having an MFR (melt flow rate, measured by test method specified in ISO 1133: 1997) of 65 g/10 min Sinneret: spinneret for sea-island type composite fibers having 16 islands/hole Spinning temperature: 285° C.

Mass ratio of island component/sea component:55/45

Discharge amount: 1.0 g/(minute·hole)

Spinning speed: 1100 m/min

The compression recovery rate of the fibrous web was 86.9%, fibers were unlikely to flatten in the thickness direction of the nonwoven fabric at the initial stage of needle punching, and the entanglement property could be enhanced. The average single fiber diameter of the ultrafine fibers constituting this artificial leather was 2.9 μm, the strength of the ultrafine fibers was 3.5 cN/dtex, the average particle diameter of the manganese-based compound in the ultrafine fibers was 0.12 μm, the manganese element content was 3.6 ppm, and the molar ratio (B/A) of the phosphorus element molar equivalent to the manganese element molar equivalent was 22.2. The artificial leather obtained using the ultrafine fiber-generating fibers had excellent abrasion resistance, and had excellent surface appearance and a dense feeling. The results are shown in Table 2.

Example 6

Artificial leather in which the compression recovery rate of the fibrous web was 88.2%, the strength of the ultrafine fibers was 3.4 cN/dtex, the average particle diameter of the manganese-based compound in the ultrafine fibers was 0.08 μm, the manganese element content was 1.2 ppm, and the molar ratio (B/A) of the phosphorus element molar equivalent to the manganese element molar equivalent was 62.5 was obtained in the same manner as in Example 1 except that polyethylene terephthalate D was used instead of polyethylene terephthalate A as an island component. The provided artificial leather had excellent abrasion resistance and very high strength, and had excellent surface appearance and a dense feeling. The results are shown in Table 2.

Example 7

Artificial leather was obtained in the same manner as in Example 1 except that sea-island type composite fibers having an island component and a sea component were melt-spun under the following conditions, and then the sea-island type composite fibers were stretched 3.0 times in a spinning oil solution bath at 90° C.

Island component: polyethylene terephthalate A

Sea component: polystyrene having an MFR (melt flow rate, measured by test method specified in ISO 1133: 1997) of 65 g/10 min Sinneret: spinneret for sea-island type composite fibers having 16 islands/hole Spinning temperature: 285° C.

Mass ratio of island component/sea component:90/10

Discharge amount: 1.8 g/(minute·hole)

Spinning speed: 1100 m/min

The compression recovery rate of the fibrous web was 86.2%, fibers were unlikely to flatten in the thickness direction of the nonwoven fabric at the initial stage of needle punching, and the entanglement property could be enhanced. The average single fiber diameter of the ultrafine fibers constituting this artificial leather was 5.7 μm, the strength of the ultrafine fibers was of 3.3 cN/dtex, the average particle diameter of the manganese-based compound in the ultrafine fibers was 0.13 μm, the manganese element content was 3.6 ppm, and the molar ratio (B/A) of the phosphorus element molar equivalent to the manganese element molar equivalent was 22.2. The artificial leather obtained using the ultrafine fiber-generating fibers had excellent abrasion resistance, and had excellent surface appearance and a dense feeling. The results are shown in Table 2.

Example 8

Artificial leather in which the compression recovery rate of a fibrous web was 85.1%, the strength of ultrafine fibers was 2.9 cN/dtex, the average particle diameter of a manganese-based compound in the ultrafine fibers was 0.20 μm, and the manganese element content was 3.6 ppm was obtained in the same manner as in Example 1 except that polyethylene terephthalate E was used instead of polyethylene terephthalate A as an island component. The obtained artificial leather was slightly inferior in abrasion resistance and strength, but had high surface appearance and a dense feeling. The results are shown in Table 2.

Example 9

Artificial leather in which the compression recovery rate of the fibrous web was 89.0%, the strength of the ultrafine fibers was 3.6 cN/dtex, the average particle diameter of the manganese-based compound in the ultrafine fibers was 0.10 μm, the manganese element content was 3.6 ppm, and the molar ratio (B/A) of the phosphorus element molar equivalent to the manganese element molar equivalent was 22.2 was obtained in the same manner as in Example 1 except that polyethylene terephthalate F was used instead of polyethylene terephthalate A as an island component. The obtained artificial leather had excellent abrasion resistance, high strength, dark color, and very uniform color developability, and had excellent surface appearance and a dense feeling. The results are shown in Table 2.

TABLE 2

| | | Example 1 | Example 2 | Example 3 | Example 4 | Example 5 | Example 6 | Example 7 | Example 8 | Example 9 |
|---|---|---|---|---|---|---|---|---|---|---|
| Ultrafine Fibers | Component | PET A | PET A | PET B | PET C | PET A | PET D | PET A | PET E | PET F |
| | Average single fiber diameter [μm] | 4.4 | 4.4 | 4.4 | 4.4 | 2.9 | 4.4 | 5.7 | 4.4 | 4.4 |
| | Average particle diameter of manganese-based compound in ultrafine fibers [μm] | 0.10 | 0.10 | 0.16 | 0.04 | 0.12 | 0.08 | 0.13 | 0.20 | 0.10 |
| | Content of manganese element in ultrafine fibers [ppm] | 3.6 | 3.6 | 3.6 | 1.2 | 3.6 | 1.2 | 3.6 | 3.6 | 3.6 |
| | Content of phosphorus element in ultrafine fibers [ppm] | 45.0 | 45.0 | 26.4 | 94.9 | 45.0 | 42.3 | 45.0 | — | 45.0 |
| | Molar ratio (B/A) of phosphorus element molar equivalent (B) to manganese element molar equivalent (A) [−] | 22.2 | 22.2 | 11.7 | 140.3 | 22.2 | 62.5 | 22.2 | — | 22.2 |
| | Strength [cN/dtex] | 3.5 | 3.5 | 3.1 | 2.8 | 3.5 | 3.4 | 3.3 | 2.9 | 3.6 |
| Woven fabric | Presence or absence of woven fabric | Absent | Present | Absent | Absent | Absent | Absent | Absent | Absent | Absent |
| | Average single fiber diameter [μm] | — | 11 | — | — | — | — | — | — | — |
| Compression recovery rate of fiber-entangled body [%] | | 89.3 | 89.3 | 87.3 | 85.4 | 86.9 | 88.2 | 86.2 | 85.1 | 89.0 |
| Elastic polymer component | | PU | PU | PU | PU | PU | PU | PU | PU | PU |
| Artificial leather | Raised nap coverage [%] | 85.0 | 85.0 | 85.0 | 85.0 | 90.0 | 85.0 | 80.0 | 85.0 | 85.0 |
| | Raised nap length [μm] | 330 | 330 | 330 | 330 | 450 | 330 | 280 | 330 | 330 |
| | Abrasion resistance (abrasion loss) [mg] | 8.3 | 8.0 | 9.4 | 10.4 | 8.3 | 8.5 | 8.8 | 10.0 | 8.0 |
| | Tensile strength [N/cm] | 70 | 113 | 62 | 57 | 60 | 67 | 59 | 57 | 67 |
| | Surface appearance | A | A | A | A | A | A | A | B | A |
| | Dense feeling | A | A | A | B | A | A | A | B | A |

Comparative Example 1

Artificial leather in which the compression recovery rate of the fibrous web was 80.5% and the strength of the ultrafine fibers was 2.8 cN/dtex was obtained in the same manner as in Example 1 except that polyethylene terephthalate G containing no manganese-based compound was used instead of polyethylene terephthalate A as an island component. The obtained artificial leather had high strength, but had poor entanglement by needle punching, and was inferior in abrasion resistance, surface appearance, and dense feeling. The results are shown in Table 3.

Comparative Example 2

Artificial leather in which the compression recovery rate of the fibrous web was 83.2%, the strength of the ultrafine fibers was 2.9 cN/dtex, the average particle diameter of a manganese-based compound in the ultrafine fibers was 0.003 μm, the manganese element content was 1.2 ppm, and the molar ratio (B/A) of the phosphorus element molar equivalent to the manganese element molar equivalent was 210.2 was obtained in the same manner as in Example 1 except that polyethylene terephthalate H was used instead of polyethylene terephthalate A as an island component. The obtained artificial leather had high abrasion resistance, but had poor entanglement by needle punching, and was inferior in strength, surface appearance, and dense feeling. The results are shown in Table 3.

Comparative Example 3

Artificial leather in which the compression recovery rate of the fibrous web was 84.1%, the strength of the ultrafine fibers was 2.2 cN/dtex, the average particle diameter of a manganese-based compound in the ultrafine fibers was 0.3 μm, the manganese element content was 3.6 ppm, and the molar ratio (B/A) of the phosphorus element molar equivalent to the manganese element molar equivalent was 7.5 was obtained in the same manner as in Example 1 except that polyethylene terephthalate I was used instead of polyethylene terephthalate A as an island component. The obtained artificial leather had high surface appearance, but had poor entanglement by needle punching, and was inferior in strength, abrasion resistance, and dense feeling. The results are shown in Table 3.

Comparative Example 4

Artificial leather in which the compression recovery rate of the fibrous web was 82.1%, the strength of the ultrafine fibers was 3.0 cN/dtex, the average particle diameter of a manganese-based compound in the ultrafine fibers was 0.06 μm, the manganese element content was 0.04 ppm, and the molar ratio (B/A) of the phosphorus element molar equivalent to the manganese element molar equivalent was 106.5 was obtained in the same manner as in Example 1 except that polyethylene terephthalate J was used instead of polyethylene terephthalate A as an island component. The obtained artificial leather had high abrasion resistance, but had poor entanglement by needle punching, and was inferior in strength, surface appearance, and dense feeling. The results are shown in Table 3.

Comparative Example 5

Artificial leather in which the compression recovery rate of the fibrous web was 83.4%, the strength of the ultrafine fibers was 2.4 cN/dtex, the average particle diameter of a manganese-based compound in the ultrafine fibers was 0.14 μm, the manganese element content was 60.0 ppm, and the molar ratio (B/A) of the phosphorus element molar equivalent to the manganese element molar equivalent was 24.2 was obtained in the same manner as in Example 1 except that polyethylene terephthalate K was used instead of polyethylene terephthalate A as an island component. The obtained artificial leather had high surface appearance, but had poor entanglement by needle punching, and was inferior in strength, abrasion resistance, and dense feeling. The results are shown in Table 3.

TABLE 3

| | | Comparative Example 1 | Comparative Example 2 | Comparative Example 3 | Comparative Example 4 | Comparative Example 5 |
|---|---|---|---|---|---|---|
| Ultrafine Fibers | Component | PET G | PET H | PET I | PET J | PET K |
| | Average single fiber diameter [μm] | 4.4 | 4.4 | 4.4 | 4.4 | 4.4 |
| | Average particle diameter of manganese-based compound in ultrafine fibers [μm] | — | 0.003 | 0.30 | 0.06 | 0.14 |
| | Content of manganese element in ultrafine fibers [ppm] | — | 1.2 | 3.6 | 0.04 | 60.0 |
| | Content of phosphorus element in ultrafine fibers [ppm] | 45.0 | 142.2 | 15.2 | 2.4 | 818.4 |
| | Molar ratio (B/A) of phosphorus element molar equivalent (B) to manganese element molar equivalent (A) [−] | — | 210.2 | 7.5 | 106.5 | 24.2 |
| | Strength [cN/dtex] | 2.8 | 2.9 | 2.2 | 3.0 | 2.4 |
| Woven fabric | Presence or absence of woven fabric | Absent | Absent | Absent | Absent | Absent |
| | Average single fiber diameter [μm] | — | — | — | — | — |
| Compression recovery rate of fiber-entangled body [%] | | 80.5 | 83.2 | 84.1 | 82.1 | 83.4 |
| Elastic polymer component | | PU | PU | PU | PU | PU |

TABLE 3-continued

| | | Comparative Example 1 | Comparative Example 2 | Comparative Example 3 | Comparative Example 4 | Comparative Example 5 |
|---|---|---|---|---|---|---|
| Artificial leather | Raised nap coverage [%] | 85.0 | 85.0 | 85.0 | 85.0 | 85.0 |
| | Raised nap length [μm] | 330 | 330 | 330 | 330 | 330 |
| | Abrasion resistance (abrasion loss) [mg] | 10.4 | 10.0 | 13.2 | 9.7 | 12.1 |
| | Tensile strength [N/cm] | 60 | 52 | 56 | 53 | 58 |
| | Surface appearance | C | C | B | C | B |
| | Dense feeling | D | D | C | D | C |

As shown in Table 2, in the artificial leather of Examples 1 to 9, it is considered that by setting the average particle diameter of the manganese-based compound contained in the ultrafine fibers constituting the artificial leather in a specific range, the manganese-based compound can also exist at the interface between the island component and the sea component, and radicals generated by oxidative decomposition or the like can be deactivated, so that the rigidity of composite fibers can be enhanced. In addition, by setting the content of the manganese-based compound contained in the ultrafine fibers constituting the artificial leather to a specific range, the rigidity of the ultrafine fibers and the composite fibers could be enhanced, and thus artificial leather was obtained which was difficultly flattened in the thickness direction at the initial stage of needle punching, highly entangled, and excellent in surface appearance and dense feeling. Furthermore, artificial leather excellent in stability during spinning and yarn strength was obtained.

On the other hand, as shown in Table 3, in a case where the ultrafine fibers constituting the artificial leather did not contain a manganese-based compound as in the artificial leather of Comparative Example 1, in a case where the average particle diameter of the manganese-based compound contained in the ultrafine fibers was outside the prescribed range as in the artificial leathers of Comparative Examples 2 and 3, or in a case where the content of the manganese-based compound contained in the ultrafine fibers was outside the prescribed range as in the artificial leathers of Comparative Examples 4 and 5, the strength of the ultrafine fibers was significantly reduced, and the ultrafine fibers were easily flattened in the thickness direction at the initial stage of needle punching, and the entanglement property was reduced, so that the artificial leather was inferior in abrasion resistance, strength, surface appearance, and dense feeling.

The invention claimed is:

1. Artificial leather comprising:
a fiber-entangled body containing a nonwoven fabric made of ultrafine fibers having an average single fiber diameter of 1.0 μm or more and 10.0 μm or less as a constituent element and
an elastic polymer,
wherein the artificial leather satisfies the following requirements:
(1) the ultrafine fibers include a polyester-based resin containing a manganese-based compound;
(2) an average particle diameter of the manganese-based compound is 0.01 μm or more and 0.20 μm or less; and
(3) the ultrafine fibers contain a manganese element in an amount of 0.1 ppm or more and 50.0 ppm or less in 100 mass % of the ultrafine fiber,
wherein the ultrafine fibers further contain a phosphorus-based compound and wherein a manganese element molar equivalent A contained in the ultrafine fibers and a phosphorus element molar equivalent B contained in the ultrafine fibers satisfy a relationship of a molar ratio of the following formula (I): $20 \leq B/A \leq 200$ (I).

2. The artificial leather according to claim 1, wherein the ultrafine fibers further contain carbon black.

3. The artificial leather according to claim 1 wherein the fiber-entangled body includes only the nonwoven fabric.

4. The artificial leather according to claim 1, wherein the fiber-entangled body further includes a woven fabric, and the nonwoven fabric and the woven fabric are entangled and integrated.

5. A method for manufacturing artificial leather according to claim 1, the method comprising:
a sea-island type composite fiber forming step of performing sea-island type composite spinning using a polyester-based resin containing a manganese-based compound having an average particle diameter of 0.01 μm or more and 0.20 μm or less as an island component and a thermoplastic resin having different solvent solubility from the island component as a sea component;
a fiber-entangled body forming step of forming a fiber-entangled body including the sea-island type composite fiber;
an ultrafine fiber forming step of dissolving and removing the sea component from the sea-island type composite fiber to form ultrafine fibers having an average single fiber diameter of 1.0 μm or more and 10.0 μm or less; and
an elastic polymer applying step of applying an elastic polymer to the fiber-entangled body.

* * * * *